United States Patent [19]

De Stefanis et al.

[11] Patent Number: 4,642,237

[45] Date of Patent: Feb. 10, 1987

[54] STABLE OXIDANT ALPHA-AMYLASE CONCENTRATES FOR USE IN BAKING

[75] Inventors: Vincent A. De Stefanis, East Amherst; Robert W. Erickson, Buffalo; Peter M. Ranum, Grand Island, all of N.Y.

[73] Assignee: Pennwalt Corporation, Philadelphia, Pa.

[21] Appl. No.: 726,750

[22] Filed: Apr. 24, 1985

[51] Int. Cl.[4] ............................................. A21D 2/22
[52] U.S. Cl. ...................................... 426/64; 426/20; 426/653
[58] Field of Search ........................... 426/653, 20, 64

[56] References Cited

U.S. PATENT DOCUMENTS

| | | | |
|---|---|---|---|
| 2,300,439 | 11/1942 | van der Lee | 426/653 |
| 3,494,770 | 2/1970 | Smerak et al. | 426/653 X |
| 3,934,040 | 1/1976 | Smerak et al. | 426/64 X |
| 4,551,334 | 11/1985 | Zentner | 426/653 X |

FOREIGN PATENT DOCUMENTS

| | | | |
|---|---|---|---|
| 1056200 | 6/1979 | Canada | 426/653 |
| 2078482 | 1/1982 | United Kingdom | 426/653 |

*Primary Examiner*—Joseph Golian

[57] ABSTRACT

Storage stable oxidant-amylase pre-mix or additive formulations, when added to wheat floor, dough or bakery mixes, produce improved bakery products having fine grain and good cell structure and volume.

1 Claim, No Drawings

STABLE OXIDANT ALPHA-AMYLASE CONCENTRATES FOR USE IN BAKING

STATEMENT OF THE INVENTION

This invention relates to yeast leavened wheat flour bakery products and more particularly to storage stable and concentrated oxidant-amylase pre-mix or additive compositions used therein which cause the product dough to attain its full volume potential while yet maintaining fine grain and good cell structure.

BACKGROUND AND SUMMARY OF THE INVENTION

Most yeast leavened products such as bread, for example, produced in this country today employ either the straight dough process or the two stage sponge and dough process.

In the straight dough process, all of the formula ingredients are mixed together to full development. Mixing is continued until the dough assumes a smooth appearance and acquires an elastic character. The dough is then subjected to a prolonged fermentation period (2-5 hrs.) at a warm temperature. After dividing the fermented dough into individual pieces, rendering, and another shorter fermentation period (intermediate proof), the dough is molded and subjected to still another fermentation period at still warmer temperatures and high humidities (proofing). After the dough has risen to the desired shape and height, it is placed in a suitable oven for baking.

The sponge and dough process requires a preliminary "sponge" preparation, wherein most of the flour is mixed with the yeast, yeast nutrients, shortening, and enough water to make a dough.

The sponge is then subjected to a lengthy bulk fermentation period (2-5 hrs.) in order to render the sponge capable of producing satisfactory bread. The sponge is then combined with the remainder of the flour and water as well as with the other dough ingredients to produce the finished dough which is then subjected to the other conventional baking steps. It is thus apparent from the above that conventional yeast bread baking methods involve prolonged bulk fermentation periods (2-7 hrs).

In the no-time baking process, the bulk fermentation period is eliminated, or substantially eliminated, by means of increasing the levels of oxidizing agents, reducing agents, enzymes, and yeast. When these ingredients are in proper balance, it is possible to produce bread and rolls of excellent quality wherein little or no fermentation is required, thus resulting in the need for less equipment, simplification of product scheduling, and a savings of labor and energy.

The no-time dough method is not new. Much of the pan and hearth bread produced today in Canada, Australia, and many other countries is made by this method. Similarly, in the United States there is currently extensive and growing use of both no-time and short-time baking, including liquid pre-ferment systems, for example, which usually involve reduced dough fermentation times.

Prior art pre-mixes or additives however, while achieving a high degree of success in eliminating or substantially reducing bulk fermentation times, as do the pre-mix or additive compositions of the present invention, were considered generally storage unstable at temperatures slightly above ambient, and were only available in concentrations requiring the presence of generous quantities thereof. The presently disclosed pre-mix or additive compositions, being highly concentrated, offer much greater economy when used in bread making processes.

The present invention discloses highly concentrated pre-mix enzyme-containing compositions which may be added to the wheat flour at the flour mill using a conventional mechanical continuous feeder available for this purpose, or the pre-mix or additive may be added to baking mixes (with flour) or baking bases (without flour). The additive may be added directly at the bakery to the dough or to a liquid pre-ferment, which is then later added to the dough, or to a sponge, as used in sponge and dough baking. When used at the bakery, the additive may be formed into a tablet or wafer for more convenient addition; or it may be preweighed into a water-soluble film package.

The present enzyme-containing additive compositions are storage stable at temperatures approaching 120° F., a very important consideration since the pre-mix or additive compositions may be subjected to hot climates, which rapidly deteriorate the enzymes. Fermentation periods require only about 15 to 30 minutes. The additive compositions or formulations of the present invention comprise oxidant-amylase mixtures, wherein the amylase is preferably fungal alpha-amylase. The oxidant is preferably ascorbic acid, potassium bromate or azodicarbonamide, and other ingredients active or inactive may be included in the additive compositions.

DETAILED DESCRIPTION OF THE INVENTION

Our additive compositions, when used in the preparation of yeast leavened bakery products in accordance with process steps hereinafter recited, reduced bulk fermentation time to about 15 to 30 minutes, required only about ⅛ to 1/10 the amount of the additive to be added to the flour as compared to known prior art additives or pre-mixes, and were storage stable up to temperatures of about 120° F. for several weeks with no degradation of critical constituents.

More specifically, there must not be any loss of either enzyme or oxidant activity under storage conditions typically encountered in the industry. In practice, the dry product is suitably stored at 50° C. for a period of two weeks. If, after that period, either the enzyme or oxidant shows a loss in activity greater than about 15%, the mixture is considered unstable and likely to cause problems if used in normal commerce. Or, if after that two week period, the mixture darkens and no longer exhibits its powdery free-flowing characteristics, the mixture is considered unstable and unacceptable for industrial use.

The addition rate of the present additive may range from 2 to 120 grams of additive for each 100 pounds of flour used. The addition rate depends upon the concentration of active ingredients in the additive, the type and needs of the baking procedure employed, the level of these same active components provided by other bakery ingredients, and the final baked product characteristics desired.

The resultant doughs yield baked products of good commercially acceptable quality. The oxidant-amylase containing additives are preferably intimately dispersed throughout the initial dough matrix, which is conveniently achieved by blending the concentrated additive composition with the flour to be used before the flour has been mixed with water and/or other liquid ingredients.

The pre-mix or additive compositions of the present invention include an oxidant selected from known oxidants, such as potassium bromate, sodium bromate, calcium bromate, ascorbic acid, potassium iodate, and azodicarbonamide, along with an alpha-amylase, preferably fungal alpha-amylase. Cereal and bacterial alpha-amylases may be employed with our present additive compositions but are more resistant to heat, i.e., require a higher temperature to inactivate them, and hence require greater control in the baking process. Since cereal and bacterial alpha-amylases are more tolerant of heat, lesser amounts thereof are required in the additive or pre-mix compositions.

Stabilizers/fillers are also employed in our additive compositions, the nature and types of which depend upon the type of oxidants and enzymes used.

Ascorbic acid, while not a true oxidizing agent, is known to function as such in the art of bread making, and may be used in our additive compositions.

The oxidant-amylase additive compositions of the present invention include the addition of 10–140 ppm of the oxidant and 500–1200 SKB of the alpha-amylase per pound of flour. Since proteolytic enzymes usually accompany the fungal alpha-enzymes, the former may be present in the additive up to about 4000 HUT/lb. of flour.

More specifically, the oxidant will comprise about 2–50 wt.% of the additive, and the alpha-amylase, whether fungal, cereal or bacterial, will be present in the additive at 100–20,000 SKB/units/gram thereof. Other ingredients, whether inactive and/or stabilizing, may be included in the pre-mix compositions. Although ascorbic acid is considered a reductant, it behaves as an oxidant in dough. Such behavior is not clearly understood by cereal scientists.

The following table presents data for one type of additive composition of the present invention for use with a reduced fermentation no-time dough baking process:

EXAMPLE NO. 1

| Additive Formulation No. 1 | | |
|---|---|---|
| Ingredient | Operable Range, wt. % | Preferred Value, wt. % |
| Ascorbic Acid | 2–25 | 19.84 |
| Fungal α-amylase Concentrate | 0.1–30 | 7.50 |
| Potassium Bromate | 0–25 | 11.30 |
| Calcium Carbonate | 0–50 | 15.00 |
| Tricalcium Phosphate | 1–10 | 3.00 |
| Starch | to make up remainder | 43.36 |

The fungal α-amylase concentrate used in the above formulation contains about 70,000 SKB units/g of α-amylase.

The above ingredients are dry blended together forming a free-flowing and stable additive mixture.

EXAMPLE NO. 2

| Additive Formulation No. 2: | | |
|---|---|---|
| Ingredient | Operable Range, wt. % | Preferred value, wt. % |
| Azodicarbonamide | 1–20 | 10.0 |
| Fungal α-amylase Concentrate | 0.1–30 | 7.5 |
| Tricalcium Phosphate | 0.2–3 | 0.5 |
| Starch | to make up remainder | 82.0 |

The fungal α-amylase concentrate used in the above formulation is identical to that employed in Additive Formulation No. 1.

Additive Formulation No. 2 is stable and requires no added calcium carbonate.

The above additives contain no cysteine, rendering the compositions more tolerant and forgiving as well as less expensive to use. The bromate and ascorbic acid provide the high level of oxidation needed in short-time or no-time baking. The high level of fungal alpha-amylase assists in gas production, provides a mellowing effect on the dough, as well as a finer grain and softer texture. The filler insures a safe and stable mixture.

For no-time dough baking, an addition rate of about 8 to 20 grams of the concentrated additive formulation per 100 pounds of flour is recommended, which weight of pre-mix or additive is about 8 to 10 times less than the weight required when standard additive compositions are used for the same quantity of flour. Lower addition rates can be used in conventional baking processes.

EXAMPLE NO. 3

| No-Time Dough Formulation and Baking Procedure A. Formulation | |
|---|---|
| Ingredient | lbs. |
| Flour | 100 |
| Sweetener | 4 |
| Salt | 2 |
| Fat | 3 |
| Yeast, compressed | 3.5 |
| Water | 61–65 |

B. Procedure 1. 16 grams of Additive Formulation No. 1 are added to the 100 lbs. of flour. (Alternatively, the 16 grams of additive may be added directly to the dough prior to mixing).
2. The salt and sweetener are dissolved in a portion of the water.
3. All of the ingredients are placed in a dough mixing bowl and mixed at low speed for about a minute and then mixed at a higher speed until fully developed, which mixing may require from 6 to 20 minutes depending upon the strength of the flour and the efficiency of the mixer.
4. The resultant dough is then scaled into individual dough pieces. A scaling weight of 520 grams is typically used to produce a one pound loaf.
5. The dough pieces are then rounded and allowed to rest for 15 minutes at 85° F. (floor time).
6. The dough pieces are then sheeted, moulded into the form of loaves, and placed into a baking pan.
7. The dough pieces are then allowed to rise (proof) for about 60 minutes at 108° F.

8. After proofing, the dough pieces are baked at 415°–430° F. for 20 minutes.

The above described procedure is very similar to the no-time straight dough methods used by commercial bakers. The additive formulations of this invention are highly functional and beneficial in no-time baking.

Two main factors which determine quality of bread produced are volume and grain. Volume of loaf bread is measured by rape seed displacement, and is normally expressed as specific volume (the loaf volume in cc divided by the loaf weight in grams).

Grain factor is a subjective measurement made by the baker. Optimum grain for no-time dough products consists of small, uniform, elongated cells having thin cell walls. Grain scores tabulated below are based on a scale of 100; the higher the score, the closer it approaches the ideal. Total bread score, as used below, is also based on a scale of 100, and includes not only the factors of volume and grain, but also dough handling properties, external loaf appearance and color, as well as internal crumb texture and color.

The following table shows the benefits derived from having both the enzyme and oxidation ingredients included in the additive formulation for no-time baking:

TABLE I

| Additive Formulations Containing Both Enzymes and Oxidants | | | |
|---|---|---|---|
| Treatment | Spec. Vol. (cc/g) | Grain Score | Total Score |
| No. 1 None | 4.1 | 65 | 38 |
| No. 2 Ascorbic Acid (70 ppm) + Potassium Bromate (40 ppm) | 5.6 | 80 | 75 |
| No. 3 Ascorbic Acid (70 ppm) + Potassium Bromate (40 ppm) + Fungal α-Amylase (900 SKB/lb of flour) | 6.4 | 81 | 85 |
| No. 4 Azodicarbonamide (40 ppm) + Fungal α-Amylase (900 SKB/lb of flour) | 5.9 | 79 | 80 |

In Treatments No. 3 and No. 4, 16 g each of Additive Formulation No. 1 and No. 2 respectively are added to 100 lbs. of the flour.

The ascorbic acid, potassium bromate, and enzyme work synergistically to produce a loaf of bread of greatly improved volume, grain, and overall quality.

Azodicarbonamide may be used as the oxidant, as shown in Treatment No. 4. The results are not quite as good as the ascorbic acid/potassium bromate system, but are very satisfactory and far superior to no treatment at all. (Treatment No. 1)

EXAMPLE NO. 4

| Sponge and Dough Formulation and Baking Procedure A. Formulation | | |
|---|---|---|
| | Ingredient | Lbs. |
| Sponge: | Flour | 65 |
| | Yeast, compressed | 2.5 |
| | Emulsifier (SSL) | 0.25 |
| | Fat | 2.5 |
| | Water | 35 |
| Dough: | Flour | 35 |
| | Salt | 2 |
| | Calcium Propionate | 0.2 |
| | Sweetener | 8 |
| | Water | 2.5–30 |

B. Procedure

1. Mix sponge ingredients one minute in first speed and two minutes in second speed using a conventional dough mixer.
2. Let sponge set 3–5 hours at 86° F. (bulk fermentation).
3. Place sponge in mixing bowl and add dough ingredients. Mix to optimum development (5–15 minutes).
4. Scale 520 grams.
5. Rest at 85° F. for 15 minutes (floor time).
6. Sheet, mold, and pan.
7. Proof at 108° F. for about one hour.
8. Bake 20 minutes at 415°–430° F.

The sponge and dough baking procedure is commonly used by many commercial bakers, and is considered by the industry of producing bread of a finer grain and texture than that produced by other bake methods.

Sponge and dough baking benefits from the addition of oxidants and enzymes, although not to the extent of products formed by no-time baking procedures (Example No. 3). The amounts of oxidants and enzymes required for sponge and dough baking are generally less, typically 2 to 5 g/100 lbs. of flour of Additive Formulation No. 1 or No. 2. The additives may be added to the flour initially, or directly to the sponge at the bakery. The beneficial effects of adding oxidants and enzymes at the abovementioned levels in sponge and dough procedures by means of a single, stable concentrate as discussed hereinabove is new and advantageous.

EXAMPLE NO. 5

Short-Time Re-mix Baking Procedure

In no time baking, bread quality (volume, grain, etc.) progressively deteriorates as the floor time is extended beyond 30 minutes. It was discovered that bread quality could be regained by simply remixing the same dough accordingly. This procedure employs the same formulation as shown in Example No. 3 above for no time doughs except:

No. 1. The dough is fully developed.
No. 2. Dough must contain Additive Formulation No. 1 or No. 2.
No. 3. Floor time is extended from 15 to 30–60 minutes.
No. 4. Dough is then remixed for at least 50% of the time required for full development of the mix (No. 1 above).

Additive Formulations No. 1 or No. 2 may be used at addition rates of 12–16 g/100 lbs. of flour. The additives must be present in step No. 1 above if optimum bread quality is to be achieved.

TABLE II

| Effect of Additive Formulation No. 1 to Bread Produced by Remix Baking Procedures | | | | |
|---|---|---|---|---|
| Treatment | Remix | Spec. Vol. (cc/g) | Grain Score | Total Score |
| No. 1 - None | No | 5.9 | 79 | 82 |
| No. 2 - None | Yes | 6.2 | 77 | 81 |
| No. 3 - 16 g/cwt of Additive Formulation No. 1 | Yes | 6.6 | 86 | 98 |

The addition of Additive Formulation No. 1 (Treatment No. 3) significantly improved remix bread grain quality where it is considered as good as or even better than that typically achieved by the Sponge and Dough baking methods.

EXAMPLE NO. 6

Liquid Pre-Ferment Formulation and Baking Procedures
A. Formulation

| | Ingredient | lbs. |
|---|---|---|
| Pre-ferment (brew) | Yeast (compressed) | 3.25 |
| | Ammonium sulfate | 0.06 |
| | Sweetener | 3.0 |
| | Salt | 0.5 |
| | Water | 55 |
| Dough | Flour | 100 |
| | Sweetener | 6 |
| | Emulsifier | 0.5 |
| | Fat | 2.5 |
| | Calcium Propionate | 0.25 |
| | Salt | 2.0 |
| | Water | 10 |

B. Procedure

The brew is prepared first and allowed to ferment for at least one hour at room temperature before being permitted to cool down to 40° F. The brew may be used at any time up to 36 hours. Use of this pre-fermented brew as a liquid yeast source is the sole difference between the instant procedure and the no-time baking procedure of Example No. 3. Both procedures are identical starting with step No. 3.

Since both procedures are so similar, the instant procedure, i.e., the liquid pre-ferment baking procedure, exhibits the same response to, and requires the same addition levels of, the oxidant/alpha-amylase concentrate. Either Additive Formulation No. 1 or No. 2 may be used.

We claim:

1. A highly concentrated additive composition for use in yeast leavened wheat flour bakery products, said additive composition being storage stable up to temperatures of about 120° F. for periods exceeding two weeks, said additive composition consisting of, by weight:
19.84% ascorbic acid
7.50% fungal α-amylase
11.30% potassium bromate
15.00% calcium carbonate
3.00% tricalcium phosphate
43.36% corn starch
said fungal α-amylase concentrate containing about 70,000 SKB units/g thereof.

* * * * *